US012484786B2

United States Patent
Narasimhan et al.

(10) Patent No.: US 12,484,786 B2
(45) Date of Patent: Dec. 2, 2025

(54) HIGH RESOLUTION DIFFUSE OPTICAL TOMOGRAPHY USING SHORT RANGE INDIRECT IMAGING

(71) Applicants: CARNEGIE MELLON UNIVERSITY, Pittsburgh, PA (US); WILLIAM MARSH RICE UNIVERSITY, Houston, TX (US)

(72) Inventors: Srinivasa Narasimhan, Pittsburgh, PA (US); Chao Liu, Pittsburgh, PA (US); Ashutosh Sabharwal, Houston, TX (US); Akash K. Maity, Houston, TX (US); Artur Dubrawski, Pittsburgh, PA (US)

(73) Assignees: CARNEGIE MELLON UNIVERSITY, Pittsburgh, PA (US); WILLIAM MARSH RICE UNIVERSITY, Houston, TX (US)

( * ) Notice: Subject to any disclaimer, the term of this patent is extended or adjusted under 35 U.S.C. 154(b) by 64 days.

(21) Appl. No.: 17/631,905

(22) PCT Filed: Apr. 21, 2021

(86) PCT No.: PCT/US2021/028421
§ 371 (c)(1),
(2) Date: Feb. 1, 2022

(87) PCT Pub. No.: WO2021/242449
PCT Pub. Date: Dec. 2, 2021

(65) Prior Publication Data
US 2023/0046768 A1    Feb. 16, 2023

Related U.S. Application Data

(60) Provisional application No. 63/013,790, filed on Apr. 22, 2020.

(51) Int. Cl.
*A61B 5/00* (2006.01)

(52) U.S. Cl.
CPC .......... *A61B 5/0073* (2013.01); *A61B 5/0077* (2013.01); *A61B 2562/028* (2013.01)

(58) Field of Classification Search
CPC ............ A61B 2562/028; A61B 5/0073; A61B 5/0077; G06T 11/006; G06T 2211/456
See application file for complete search history.

(56) References Cited

U.S. PATENT DOCUMENTS

| 6,873,867 B2 * | 3/2005 | Vilsmeier ............. A61B 34/20 606/130 |
| 2015/0286785 A1 * | 10/2015 | Hielscher ............... G16H 50/20 382/131 |

(Continued)

OTHER PUBLICATIONS

Jon Chouinard, "What are global shutters and rolling shutters in machine vision cameras? How can we use lower cost rolling shutter cameras?," Jan. 3, 2018, 1st Vision (Year: 2018).*

(Continued)

*Primary Examiner* — Michael J Carey
*Assistant Examiner* — Maria Christina Talty
(74) *Attorney, Agent, or Firm* — KDW FIRM PLLC (57) ABSTRACT

A fast imaging apparatus and method for high resolution diffuse optical tomography with a line imaging and illumination system is disclosed. The method uses an algorithm comprising a convolution approximation of the forward heterogeneous scattering model that can be inverted to produce deeper than ever before structured beneath the surface. The method can detect reasonably accurate boundaries and relative depth of absorption variations up to a depth of approximately 8 mm below highly scattering medium such as skin.

7 Claims, 8 Drawing Sheets

(56) References Cited

U.S. PATENT DOCUMENTS

| | | | | |
|---|---|---|---|---|
| 2016/0143623 | A1* | 5/2016 | Schroecker | G06T 15/08 600/443 |
| 2016/0278715 | A1 | 9/2016 | Yu et al. | |
| 2017/0134710 | A1* | 5/2017 | Wang | H04N 13/261 |
| 2019/0246905 | A1* | 8/2019 | Belthangady | G06T 7/521 |
| 2020/0092533 | A1* | 3/2020 | Narasimhan | H04N 13/211 |
| 2020/0258300 | A1* | 8/2020 | Schwarz | G06T 11/006 |
| 2021/0209818 | A1* | 7/2021 | Travish | A61B 6/4007 |
| 2022/0343517 | A1* | 10/2022 | Wang | G16H 40/67 |

OTHER PUBLICATIONS

G. Smith et al., "Automated, Depth-Resolved Estimation of the Attenuation Coefficient From Optical Coherence Tomography Data," Dec. 2015, IEEE Transactions on Medical Imaging, 34, pp. 2592-2602 (Year: 2015).*

"Rolling vs Global Shutter," 2020, Teledyne Photometrics (Year: 2020).*

International Search Report and Written Opinion for International Patent Application No. PCT/US2021/028421 mailed on Jan. 5, 2022, 10 pages.

Cuccia et al., "Quantitation and mapping of tissue optical properties using modulated imaging", NIH Public Access [online], May 12, 2009. Retrieved from the Internet URL: <https://www.ncbi.nlm.nih.gov/pmc/articles/PMC2868524/pdf/nihms165228.pdf>, Retrieved on Oct. 20, 2021, 31 pages.

Borjkhani et al., "Performance assessment of high-density diffuse optical topography regarding source detector array topology", Plos One [online], Mar. 24, 2020. Retrieved from the Internet URL: <https://aip.scitation.org/doi/pdf/10.1063/1.4944562>, Retrieved on Oct. 20, 2021, 20 pages.

* cited by examiner

HIGH RESOLUTION DIFFUSE OPTICAL TOMOGRAPHY USING SHORT RANGE INDIRECT IMAGING

RELATED APPLICATIONS

This application is a national phase filing under 35 U.S.C. § 371 claiming the benefit of and priority to International Patent Application No. PCT/US2021/028421, filed on Apr. 21, 2021, which claims priority to U.S. Patent Application Ser. No. 63/013,790 entitled "HIGH RESOLUTION DIFFUSE OPTICAL TOMOGRAPHY USING SHORT RANGE INDIRECT IMAGING" filed on Apr. 22, 2020. The contents of the aforementioned applications are incorporated herein by reference in their entireties.

GOVERNMENT INTEREST

This invention was made with government support under the National Science Foundation Expeditions "See Below the Skin" Grants No. 1730147 and No. 1730574, and U.S. Army Medical Research and Materiel Command contract for "Autonomous Trauma Care in the Field" No. W81XWH-19-C-0083. The government has certain rights in the invention.

BACKGROUND OF THE INVENTION

Imaging below the skin and through tissue is important for diagnosis of several dermatological and cardiovascular conditions. MRI remains the best current approach to obtain a 3D dimensional visualization below the skin. But MRI is expensive, requires visits to a hospital or imaging center, and the patients are highly inconvenienced. Non-invasive imaging using visible or near-infrared light has the potential to make devices portable, safe, and convenient to use at home or at point-of-care centers.

While light penetrates deep through tissue, it scatters continuously resulting in poor image contrast. This makes it challenging to recover useful properties about the anatomical structures below the skin. Further, the anatomical structures include a complex heterogeneous distribution of tissue, vasculature, tumors (benign or malignant) that vary in optical properties (density, scattering, absorption) and depths below the skin. This makes the modeling of light propagation below skin challenging.

Fortunately, under the highly scattering regime, the photons can be assumed to be traveling diffusely in the medium and can be described as a random walk. This has enabled accurate forward models under diffuse photon propagation. In order to improve contrast, imaging detectors and sources are placed at different locations on the skin. This arrangement captures only indirectly scattered light while eliminating the dominant direct reflection and backscatter. The approaches that attempt to invert the diffusion model with such indirect light imaging systems are commonly classified as "Diffuse Optical Tomography" (DOT).

DOT is an approach to recover subsurface structures beneath the skin by measuring light propagation beneath the surface. The method is based on optimizing the difference between the images collected and a forward model that accurately represents diffuse photon propagation within a heterogeneous scattering medium. However, to date, most works have used a few source-detector pairs and recover the medium at only a very low resolution. And increasing the resolution requires prohibitive computations/storage.

Figure 1A:
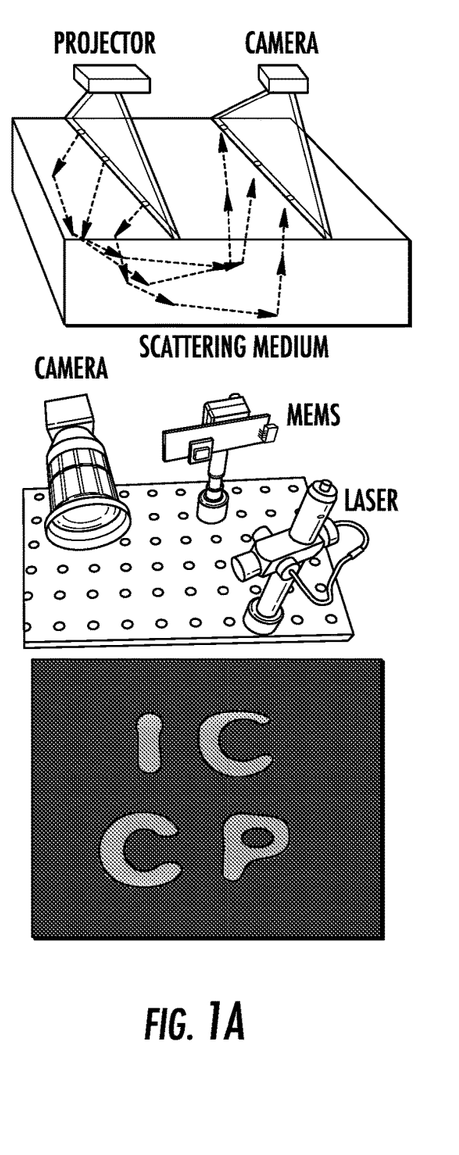
Figure 1B:
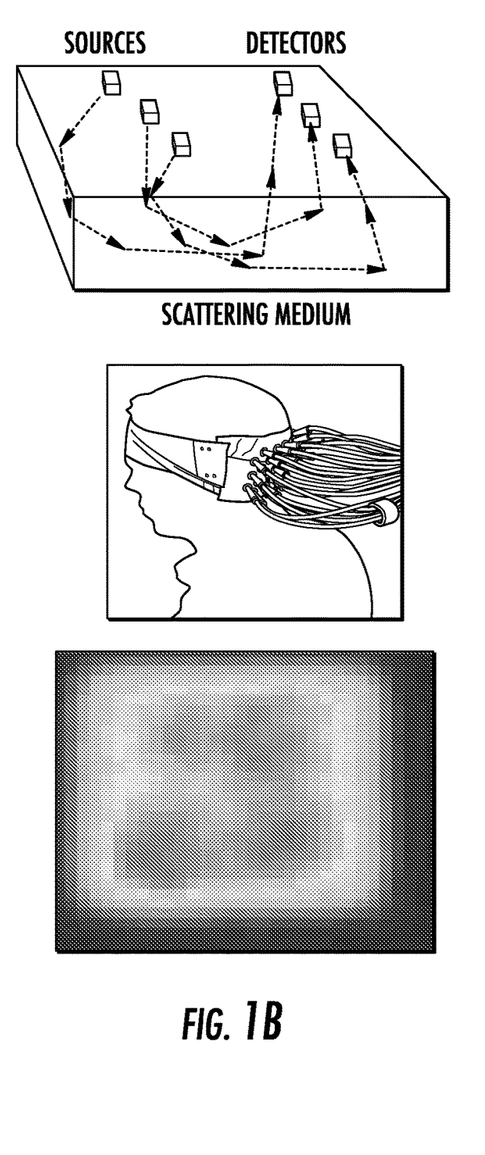

Due to their portability and ease of use, DOT is becoming an attractive choice over traditional modalities like MRI for cerebral as well as hemodynamic imaging More recently, DOT has been shown to be a promising tool in detecting strokes, breast cancer, and thyroid imaging. There are, however, two important drawbacks to existing DOT approaches. First, the number of source-detector pairs limits the form-factor of the device. Even with multiple source-detector pairs, applying traditional inverse methods for DOT results in poor resolution, as shown in the second column of View (B) of FIG. 1. Second, as the number of source-detector pairs increases, the computational complexity of the algorithms that recover the volumetric medium increases prohibitively.

SUMMARY OF THE INVENTION

The apparatus and method disclosed herein comprises a novel hardware arrangement and a fast imaging and algorithm for high resolution diffuse optical tomography with a line imaging and illumination system.

An imaging and algorithmic approach to resolve these fundamental drawbacks in DOT systems is presented. Instead of separate source-detector pairs, a high resolution 2D camera and a MEMS projector is used to obtain a large number of effective source-detector pairs, as is commonly done in vision and graphics. This makes the system much more compact and programmable. Second, to increase the speed of acquisition, a line on the skin is illuminated and a different line is captured in the sensor. This arrangement captures short-range indirect light transport much faster than point-to-point illumination and sensing but uses a rectified configuration where the projector and camera planes are parallel, leading to a low spatial resolution over a large overlapping stereo volume. The design of the present invention has a verged configuration that enables high spatial resolution imaging within a small region on the skin (approximately 8 cm×8 cm).

Using this verged design, the invention includes an efficient algorithm that is based on the convolution approximation to the forward model for light propagation in a heterogeneous subsurface medium. The convolution kernel is independent of the heterogeneous structure and only depends on the imaging configuration and the scattering properties of the homogeneous scattering medium. This allows the recovery of the heterogeneous structures at much higher spatial resolution compared with the traditional DOT, as shown in the bottom image in View (B) of FIG. 1.

Key to the present invention is a convolution approximation of the forward heterogeneous scattering model that can be inverted to recover deeper than ever before structures beneath the surface. The method can detect reasonably accurate boundaries and relative depth of heterogeneous structures up to a depth of 8 mm below highly scattering medium such as skin. This work extends the potential of DOT to recover intricate structures (blood vessels, tissue, tumors, etc.) deep beneath the skin for diagnosing many dermatological and cardio-vascular conditions.

BRIEF DESCRIPTION OF THE DRAWINGS

FIG. 1, View (A) shows diffuse optical tomography (DOT) with line-scanned camera and line scanning MEMS projector compared, in View (B), with traditional DOT with 25 source-detector pairs.

FIG. 3 shows the generation of short-range indirect images for a small and a large pixel-to-illumination distances, shown in View (A) and View (B) respectively.

FIG. 4 shows visualizations of phase functions for different pixel-to-illumination line distances in View (A) and View (B), in the y-z plane (top row), and the x-y plane (bottom row).

FIG. 5 shows images of a paper sticker with letters occluded by several other pages captured using different devices in Views (A-D).

FIG. 6, View (A) shows a configuration for the calibration of the device of the present invention. View (B) shows a graph accounting for mis-alignment of the MEMS mirror.

FIG. 7, Views (A, B) shows different planes illuminated with poses relative to the camera. View (C) shows laser rays fitted in 3D space.

FIG. 8, Views (A-C) show simulated direct/global light image, short-range images with different $\Delta y$ settings, and the DOT results.

DEFINITIONS

Absorption Variation (also referred to as a "heterogeneity") is defined as any subdermal area having an absorption coefficient different from the background homogeneous scattering medium, which has a relatively homogeneous absorption coefficient. The absorption variation can be caused by, for example, a subdermal structure such as blood vessels, tumors, benign tissue, etc.

DETAILED DESCRIPTION

As a prelude to a discussion of the convolution approximation of the heterogeneous model, the basic theory in DOT for dense scattering tissues is derived. First, the Diffusion Equation for the surrounding homogeneous medium is derived from the Radiative Transfer Equation, assuming that the homogeneous scattering medium surrounding the absorption variation is dense enough such that the light propagation in the medium is dominated by the high-order light scattering events and the angular distribution of light propagation direction is isotropic. Thereafter, the Diffusion Equation for the heterogeneities is derived, assuming that the light absorption coefficient discrepancy dominates the scattering property difference between the heterogeneous embedding and the surrounding medium. Although the assumptions do not always hold perfectly, the method of the present invention is robust to the cases where the assumptions fail.

Figure 2:
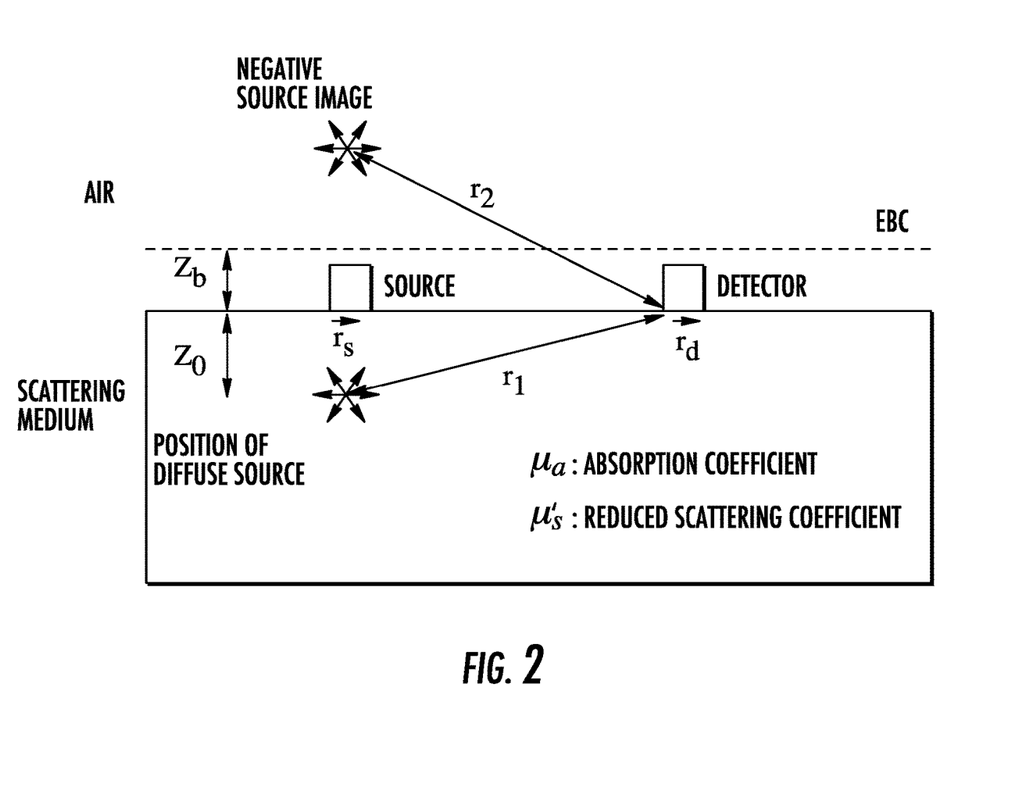
FIG. 2 shows the source-detector configuration in a typical DOT system. The fluence rate at the detector is given by superposition of the real diffuse source located $z_0$ below the surface, and a negative image source around the zero flux line denoted by EBC.

The Radiative Transfer Equation (RTE) describes the light radiance, which models light propagation, at a particular position in the scattering medium at a specific time instant. It is generally difficult to solve the RTE in closed form. When the medium is highly scattering, as in the case of biological tissue, the diffusion approximation is commonly applied to obtain the diffusion equation. The photon diffusion equation models the fluence rate $\Phi$, that is defined as the total light radiance integrated over all directions, at a position $\vec{r}$ in the scattering medium for a continuous intensity light source S, given as:

$$(-D(\vec{r})\nabla^2 + \mu_a(\vec{r}))\Phi(\vec{r}) = S(\vec{r}) \quad (1)$$

where $\mu_a(\vec{r})$, $\mu'_s(\vec{r})$ are the absorption coefficient and the reduced scattering coefficient of the medium respectively, and $D(\vec{r}) = 1/(3(\mu'_s(\vec{r}) + \mu_a(\vec{r})))$ is known as the diffusion coefficient of the scattering medium. The tissue is commonly modeled as a semi-infinite scattering homogeneous medium, with the source and the detector positioned at the air-medium interface. When the light source is treated as a constant pencil beam source, i.e. $S(\vec{r}) = S\delta(\vec{r_s})$, the solution for fluence rate in Eq. (1) for the configuration in FIG. 2 can be written in an analytical form using extrapolated zero boundary conditions (EBC):

$$\Phi_0(\vec{r}, \vec{r_s}) = \frac{s}{4\pi D_0}\left[\frac{e^{-\beta r_1}}{r_1} - \frac{e^{-\beta r_2}}{r_2}\right] \quad (2)$$

where, $\Phi_0(\vec{r}, \underline{r_s})$ is the fluence rate at detector kept at a position $r_d$ with a constant source at $\vec{r_s}$. The diffusion coefficient of the homogeneous medium is denoted by $D_0$ and the term $\beta = \sqrt{3\mu'_s\mu_a}$ depends on the optical properties of the homogeneous scattering medium. The extrapolated boundary condition (EBC) accounts for the refractive index mismatch of air and the medium.

Solving for the boundary condition defines a zero fluence rate line located $z_b$ above the air-medium interface. This boundary line is imposed by placing a negative image of the source around the zero-crossing line. The terms $r_1$ and $r_2$ are the distances from the detector to the real and the negative image source respectively, and they are defined as:

$$r_1 = |\vec{r_s} + z_0 + \vec{r_d}|$$

$$r_2 = |\vec{r_s} - z_0 - 2z_b - \vec{r_d}| \quad (3)$$

where, $z_0 = 3D$ is the location of diffused source in the medium. The term $z_b$ is the distance of the zero fluence rate boundary from the air-medium interface.

Often, it is desirable to reconstruct objects like veins or tumors embedded within human tissue. Typically, these objects have different optical parameters than the background medium. In the presence of an absorption variation, the change in absorption coefficient of the medium can be defined as:

$$\mu_a(\vec{r}) = \mu_{a_0} + \delta\mu_a(\vec{r}) \quad (4)$$

where $\delta\mu_a(\vec{r})$ is the difference in absorption coefficient of the absorption variation over the background medium. It is assumed that the change in the reduced scattering coefficient $\mu'_s(\vec{r})$ is negligible and can be ignored. The resultant fluence rate at the detector position $\vec{r_d}$ for a source at $\vec{r_s}$ is written as a linear addition of fluence rate from homogeneous component $\Phi_0(\vec{r_d}, \vec{r_s})$ and the change in fluence rate $\Delta\Phi(\vec{r_d}, \vec{r_s})$ due to the absorption variation:

$$\Phi(\vec{r_d}, \vec{r_s}) = \Phi_0(\vec{r_d}, \vec{r_s}) + \Delta\Phi(\vec{r_d}, \vec{r_s}) \quad (5)$$

The change in fluence rate is due to the absorption coefficient change across the volume around the point of interest:

$$\Phi(\vec{r_d}, \vec{r_s}) = -\int \Phi_0(\vec{r_d}, \vec{r_j}) \frac{\delta\mu_a(\vec{r_j})}{D_0} G_0(\vec{r_j}, \vec{r_d}) d\vec{r_j} \quad (6)$$

where $G_0$ represents the Green's function for a homogeneous slab and is related to $\Phi_0$ in Eq. (2) as $G_0=D_0\Phi_0/S$. Images are acquired using a CCD camera, which records the radiant exitance at the surface. The radiant exitance is proportional to the diffuse reflectance R, which is the projection of current density along the surface normal of the detector for a unit-power source:

$$R(\vec{r_d}, \vec{r_s}) = D_0 \left[\frac{\delta \Phi}{\delta z_d}\right]_{z_d=0} \quad (7)$$

where $z_d$ is the z component of the detector location $\vec{r_d}$. Applying a derivative to Eq. (5) with respect to $z_d$ and multiplying by $D_0$, yields:

$$R(\vec{r_d},\vec{r_s})=R_0(\vec{r_d},\vec{r_s})+\Delta R(\vec{r_d},\vec{r_s}) \quad (8)$$

where $R_0=D_0[\delta\Phi_0/\delta z_d]_{z_d=0}$ is the diffuse reflectance due to the homogeneous background medium and is obtained by taking a derivative of $\Phi_0$ in Eq. (2) with respect to $z_d$, given by:

$$R_0 = \frac{1}{4\pi}\left[\frac{z_0(1+\beta r_1)e^{-\beta r_1}}{r_1^3} + \frac{(z_0+2z_b)(1+\beta r_2)e^{-\beta r_2}}{r_2^3}\right] \quad (9)$$

Similarly, $\Delta R$ represents the change in diffuse reflectance for the absorption variation. The expression for $\Delta R$ is obtained by taking a derivative of Eq. (6) with respect to $z_d$ and multiplying by D, resulting in the following expression:

$$\Delta R(\vec{r_d}, \vec{r_s}) = -\int \Phi_0(\vec{r_s}, \vec{r_j}) \delta\mu_a(\vec{r_j}) \left[\frac{\delta G_0(\vec{r_j}, \vec{r_d})}{\delta z_d}\right]_{z_d=0} d\vec{r_j} = \quad (10)$$
$$-\int \Phi_0(\vec{r_s}, \vec{r_j}) \delta\mu_a(\vec{r_j}) R_0(\vec{r_j}, \vec{r_d}) d\vec{r_j}$$

The integral above is discretized by dividing the medium into N voxels, and the optical properties are defined for each voxel. If the medium is discretized into N voxels with volume of each voxel as $h^3$, then Eq. (10) can be written in the discrete summation form given by:

$$\Delta R(\vec{r_d},\vec{r_s})=\Sigma_{j=1}^N=P(\vec{r_s},\vec{r_j},\vec{r_d})\delta\mu_a(\vec{r_j})$$

with $$P(\vec{r_s},\vec{r_j},\vec{r_d})=\Phi_0(\vec{r_s},\vec{r_j})R_0(\vec{r_j},\vec{r_d})h^3 \quad (12)$$

The term $P(\vec{r_s}, \vec{r_j}, \vec{r_d})$ is commonly known as the phase function defined at each voxel position $\vec{r_j}$ in the medium. The values of the phase function depend on the optical properties of the background homogeneous medium as well as the location of the source $\vec{r_s}$ and the detector $\vec{r_d}$. Note that the phase function is independent from the structure of the absorption variation.

Convolution Approximation of Heterogeneous Model

Herein is described how the diffuse forward model can be adapted for the use in the present invention. A line illumination is projected on the scene using a laser projector. As such, the light source is now considered as a slit source instead of a point source. By using a slit source, the acquisition time is reduced because line scanning is significantly faster than point scanning A slit source is incorporated in the forward model by using the linear superposition principle. The quantities described in the previous section which are functions of the source location $\vec{r_s}$ are now obtained by adding up the contributions corresponding to all the point sources on the illumination line.

Note that the invention is explained in terms of embodiments using a laser. However, as would be realized by one of skill in the art, light sources and sensors of any wavelength could be used, for example, visible, near-infrared, short wave infrared, etc. In addition, any sensor modalities could be employed, for example, intensity, color, multispectral, timer-of-flight, correlation time-of-flight or any other modality.

Figure 3A:
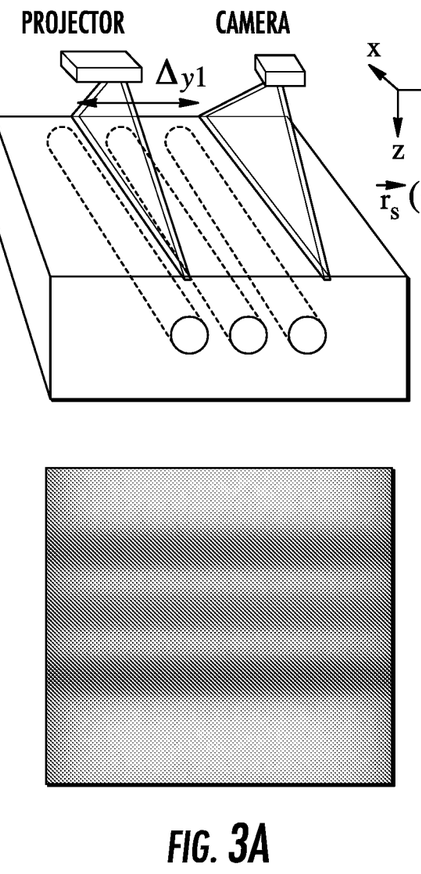
Figure 3B:
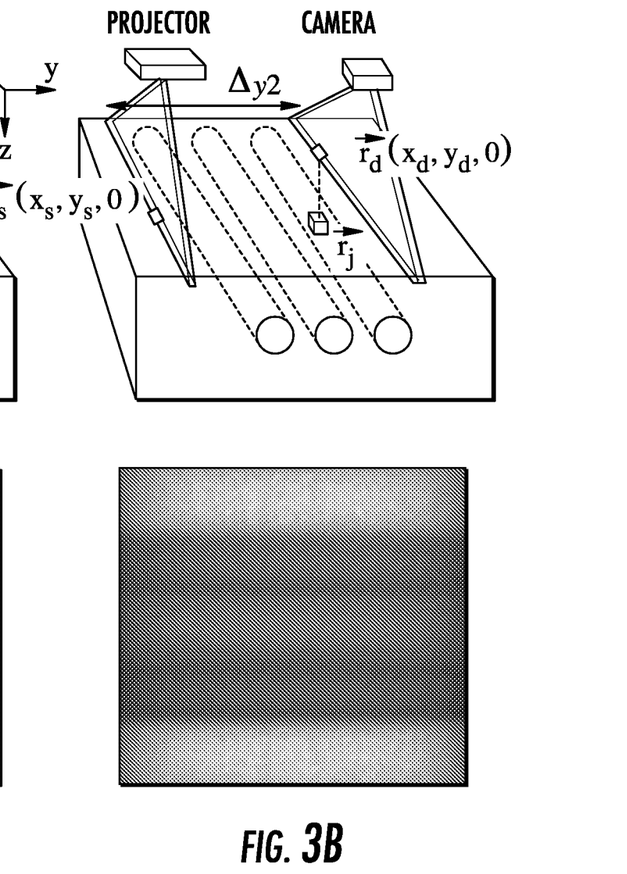

On the detector side, a rolling shutter camera synchronized with the laser projector is used. The advantage of using a camera is that each pixel in the camera sensor can now be considered as an individual detector, resulting in a detector array with millions of detectors. Secondly, because the camera sensor can be considered as a grid array of detectors, a convolution form of the forward model can be derived, significantly speeding up the computation time. Several images are acquired by varying the pixel-to-illumination line distance (i.e., offset $\Delta y$), as shown in FIG. 3, which shows the pixel-to-illumination line distance increasing between View (A) and View (B). FIG. 3 shows the generation of short-range indirect images for a small pixel-to-illumination distance, in View (A), and a large pixel-to-illumination distance, in View (B). The simulated scene consists of three cylinders embedded in a scattering medium. The offset $\Delta y$ is kept constant while scanning the entire scene to obtain an image. For a shorter $\Delta y$, as in View (A), the cylinders are distinctly visible, whereas for longer $\Delta y$, as in View (B), the blurring increases with reduction of signal-to-noise ratio.

These images are referred to as short-range indirect images. The boundaries of the absorption variations become blurrier in the short-range indirect image as the pixel to illumination line distance $\Delta y$ increases. The blurring effect is related to $\Delta y$ and the depth of the structures.

Figure 4A:
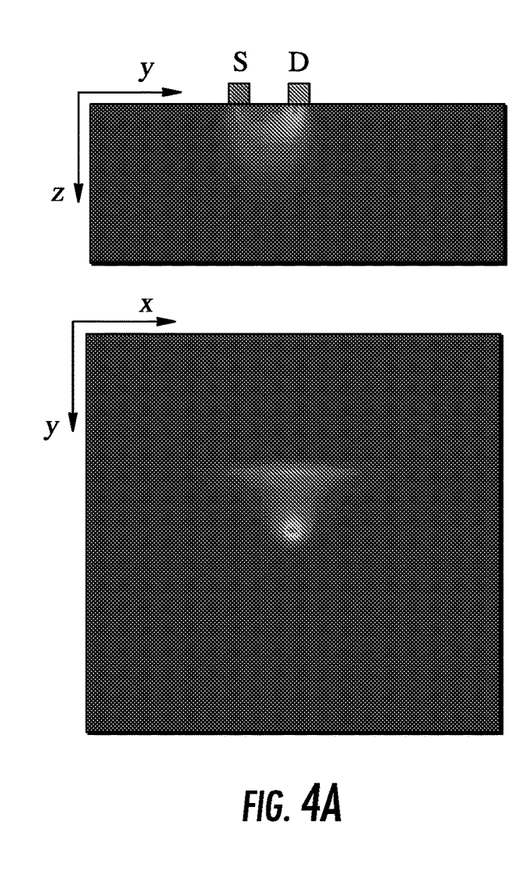
Figure 4B:
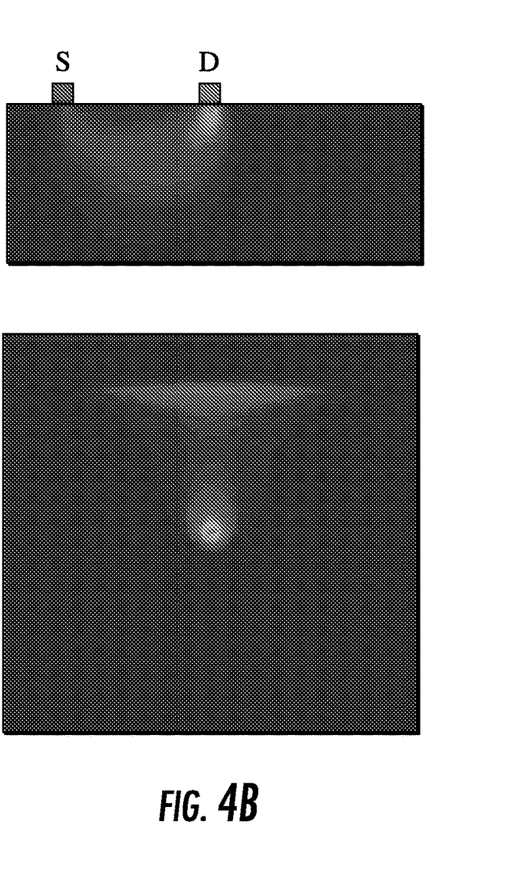
Figure 5A:
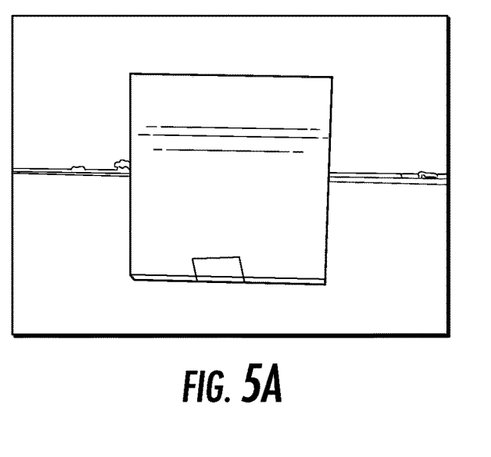
Figure 5B:
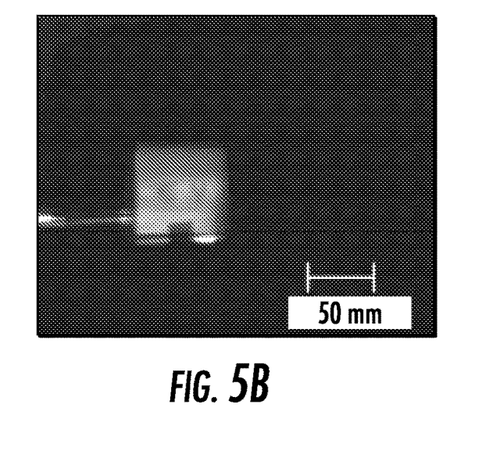
Figure 5C:
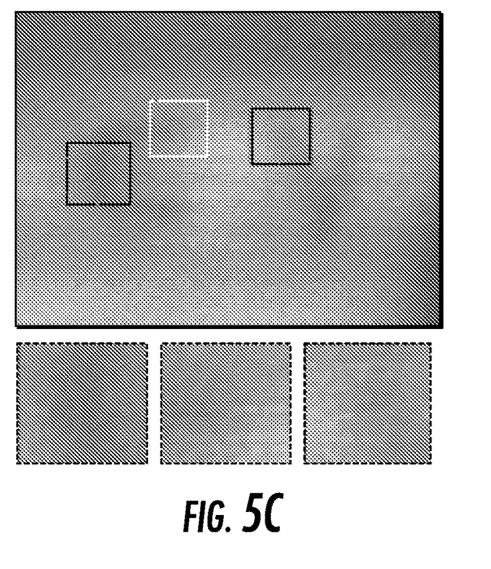
Figure 5D:
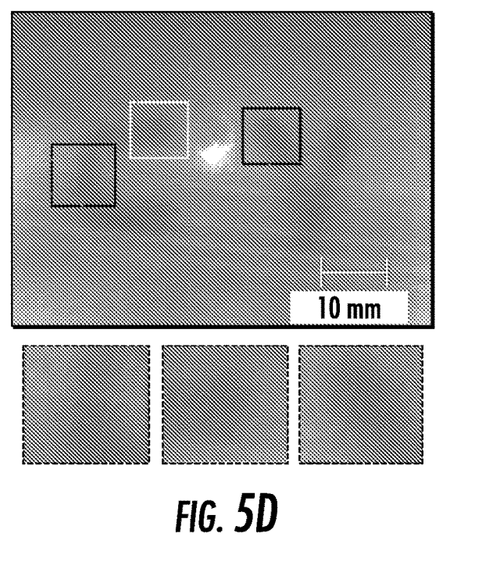

The values of the phase function at each voxel for the short-range indirect images can be interpreted as the number of photons that have traversed through the corresponding voxel for a given pixel to illumination line distance. FIG. 4 is a visualization of the phase function for different pixel-to-illumination line distances in the y-z plane (top row), and the x-y plane (bottom row). S and D represent the illumination line and pixel location respectively. As the pixel to illumination line distance increases, as shown between View (A) and View (B), the photons tend to travel deeper into the scattering medium but leads to reduced number of photons reaching the pixel, thereby reducing the signal-to-noise ratio. Typically, the most probable path between a pixel and the source illumination line follows a well-known "banana shape" and is shown for different pixel to illumination line distances in FIG. 4.

Two important properties of the phase function P should be noted. First, in case of simple geometry, like the semi-infinite homogeneous background medium under consideration, the expression for the Green's function $G_0$ as well as $\Phi_0$ can be written in terms of relative voxel location rather than the absolute location:

$$P(\vec{r_d}, \vec{r_j}, \vec{r_s}) = \Phi_0(\vec{r_s} - \vec{r_j})R_0(\vec{r_j} - \vec{r_d}) \quad (13)$$
$$= P(\vec{r_j} - \vec{r_d}, \vec{r_s} - \vec{r_d})$$

Second, it should be noted that the values of the phase function decays fast spatially as the distance between a voxel and source or detector position increases. Hence, the contribution of voxels that are far away from both the illumination line and the pixel can be neglected. Because a projected line is being used as the light source, the phase function in Eq. (13) can be approximated by the summation of truncated phase functions for each source point along the illumination line. Additionally, as evident from the figure, the contribution of light from the illumination line to a center pixel is dominant only near the center of the illumination line, and hence a spatially-invariant phase kernel can be used. The pixel-to-illumination line distance $\Delta y$ is defined as $y_s - y_d$, where $y_s$ and $y_d$ are the y components of illumination row $\vec{r_s}$ and the pixel location $\vec{r_d}$ respectively. The phase kernel $\varkappa$ for a line illumination can then be written as:

$$\varkappa(\vec{r_j} - \vec{r_d}, \Delta y) = \sum_{\vec{r_s}} P(\vec{r_j} - \vec{r_d}, \vec{r_s} - \vec{r_d}) \quad (14)$$

where the summation over $\vec{r_s}$ is for all the point sources lying on the illumination line. In the following, the phase kernel is denoted as $\varkappa(\Delta y)$ for denotation simplicity unless the spatial dependency needs to be emphasized.

Similarly, the diffuse reflectance $R(\vec{r_d}, \vec{r_s})$, the change in diffuse reflectance $\Delta R(\vec{r_d}, \vec{r_s})$ and the homogeneous diffuse reflectance $R_0(\vec{r_d}, \vec{r_s})$ in Eq. (8) are modified for line illumination as the sum of contribution from all point sources lying on the illumination line, and are defined as $R(\vec{r_d}; \Delta y)$, $R(\vec{r_d}; \Delta y)$ and $R_0(\vec{r_d}; \Delta y)$ respectively. $x_d$, $y_d$ are the surface coordinates of the pixel location $\vec{r_d}$ as shown in FIG. 3. If the change in absorption coefficient $\delta\mu_a(\vec{r_d})$ in Eq. (11) is represented by a 3D volume Q, then the change in diffuse reflectance $\Delta R$ in Eq. (11) can now be expressed in a convolution notation as:

$$\Delta R(x_d, y_d; \Delta y) = \quad (15)$$
$$-\sum_{\vec{r_s}} \sum_{j=1}^{N} P(\vec{r_j} - \vec{r_d}, \vec{r_s} - \vec{r_d}) \delta\mu_a(\vec{r_j}) = -\sum_{j=1}^{N} \varkappa(\vec{r_j} - \vec{r_d}; \Delta y) \delta\mu_a(\vec{r_j})$$

where $\Delta R \in \mathbb{R}^{M \times N}$ is defined over a sensor array of dimension M×N and corresponds to each pixel to illumination line distance $\Delta y$ as shown in FIG. 3. By representing the change of absorption coefficient $\delta\mu_a$ by a 3D volume Q, Eq. (15) can be rewritten as the sum of a 3D convolution result:

$$\Delta R(x_d, y_d; \Delta y) = -\sum_z \varkappa(\Delta y) * Q(x_d, y_d, z) \quad (16)$$

The change in absorption coefficient in the 3D volume is denoted by $Q \in \mathbb{R}^{M \times N \times D}$ where D is the depth resolution. The 3D truncated kernel $\varkappa \in \mathbb{R}^{M \times N \times D}$ is then defined for each $\Delta y$, and has the same depth resolution as that of the 3D volume Q. Using Eq. (8), the resultant diffuse reflectance R acquired at each pixel to illumination line distance $\Delta y$ can be written as a linear summation of the contribution from homogeneous background medium $R_0$ and the perturbation term due to presence of heterogeneity $\Delta R$:

$$R(x_d, y_d; \Delta y) = R_0(x_d, y_d; \Delta y) - \sum_z \varkappa(\Delta y) * Q(x_d, y_d, z)$$

where $R \in \mathbb{R}^{M \times N}$ is the diffuse reflectance on an M×N grid.

Reconstruction of Heterogeneous Structure

For the set of captured images which correspond to different pixel to illumination line $\Delta y$, a set of short-range indirect images $I(\Delta y)$ is captured. For the given set of images, the volume Q of unknown optical parameters is reconstructed by solving the following optimization problem:

$$\min_Q \cdot \sum_{\Delta y = T_{d_{min}}}^{T_{d_{max}}} \|I(\Delta y) - l(R_0(\Delta y) - \varkappa(\Delta y) * Q\|_F^2 + \lambda \|Q\|_1 \quad (17)$$

where $\|\cdot\|F$ denotes the Frobenius norm, and l is an unknown scaling factor which depends on the intensity and width of the laser profile and the sensitivity of the camera. It is also assumed that the reconstructed volume is sparse, which essentially implies that the absorption variation only occupies a fraction of the total reconstructed volume.

The optimization is done over a range of $\Delta y$ values. For smaller $\Delta y$ values, the diffusion approximation breaks down, as the photon propagation is largely governed by single or very few scattering events. For very large $\Delta y$, not enough photons reach the camera pixels, and therefore the measurement images have a poor signal-to-noise ratio. Therefore, the range of $\Delta y$ values needs to be chosen appropriately.

If the exact optical parameters $\mu'_s$ and $\mu_a$ of the homogeneous background medium are known, then the kernel $\varkappa(\Delta y)$ can be constructed as in Eq. (14). However, in some cases, the background optical parameters of the material are not known. In those cases, a homogeneous patch inside the field of view is selected, and the pixel intensity measurements are fitted with $lR_0$ with respect to the unknown optical coefficients as in Eq. (9). The estimated values of the coefficients can be used to construct the phase kernel $\varkappa(\Delta y)$ for solving the optimization in Eq. (17).

A machine learning library (e.g., PyTorch™) may be used for implementation, given it is highly optimized for convolution operations. The running time on a workstation with TitanX GPU is around 5 minutes for 300 iterations for Q with a depth resolution of 64. The $\lambda$ value in Eq. (17) is heuristically chosen to be 0.0001. The optimization is started with an initial value of all zeros for Q, and the reconstruction accuracy can be further improved if a better initialization is provided based on prior knowledge of the scene.

Hardware

The imaging setup for capturing shortrange indirect images will now be described. To capture high resolution images for a small area of interest, high spatial resolution over a smaller overlapping stereo volume is needed. One way to achieve smaller overlapping stereo volume is to verge the projector and camera. Therefore, a design using a verged setup is used for capturing high resolution short-range indirect images.

The setup consists of a synchronized rolling shutter camera and a laser projector implemented with Micro-Electro-Mechanical-Systems (MEMS). The imaging setup is shown in View (A) of FIG. 1. In some embodiments, an industrial camera and Mirrorcle MEMS development kit may be used. The central wavelength for the laser light may be selected as 680 nm. The MEMS mirror reflects the laser beam from the laser diode and the orientation of the MEMS mirror can be controlled in terms of both vertical and horizontal rotation axes. Using this arrangement, the size of the imaged area on the sample is approximately 8 cm by 8 cm. The laser diode and MEMS mirror pair is modeled as a pinhole projector whose center of projection is the center of rotation of the MEMS.

During the imaging process, the projector is scanned through the epipolar planes of the projector-camera pair. The camera is synchronized such that the pixels having a predefined offset from the corresponding epipolar line on the camera image plane are exposed. Each offset corresponds to one pixel to illumination line distance $\Delta y$ as discussed above. For the physically rectified projector-camera pair, the epipolar lines on the projector and camera image are horizontal. This corresponds to illuminating and exposing the corresponding rows of projector and camera. In contrast, in the described configuration, the epipolar lines in the projector and camera are not horizontal due to the verged setup. As such, the short-range indirect images cannot be captured by illuminating and exposing corresponding rows. Instead, on the projector side, the angle of the MEMS mirror is controlled to scan the light laser beam across a pencil of epipolar lines with different 2D slopes in the projector image plane. On the camera side, interpolation is used over offset epipolar lines to get the short-range indirect images. As a special case, for $\Delta y=0$ the interpolated line overlaps with the epipolar. The resultant image is the direct light image.

Because the described configuration has smaller FOV than a rectified system due to the non-zero vergence angle between the project and camera, the sample can be placed closer to the camera while still being illuminated by the projector. This enables a higher image resolution for a smaller area of interest so that more fine-grained (sub) surface details can be captured.

FIG. 5 shows images of a paper sticker captured with different devices. The sticker page with letters is occluded by several other pages so no letters can be seen under regular lighting. View (A) shows an image captured with cellphone camera under regular lighting. View (B) shows a short-range indirect image captured with a device in a rectified configuration. View (C) is an enlarged image for the sticker region in View (B). View (D) shows a short-range indirect image captured with the configuration of the present invention. The configuration of the device of the present invention has a smaller FOV due to non-zero vergence angle. The images captured with this device have higher resolution, SNR and contrast as shown in the Views (C) and (D). The bright spot in the center and the lines in View (D) are due to the reflection and inter-reflections from the protective glass in front of the MEMS mirror.

Calibration

Figure 6A:
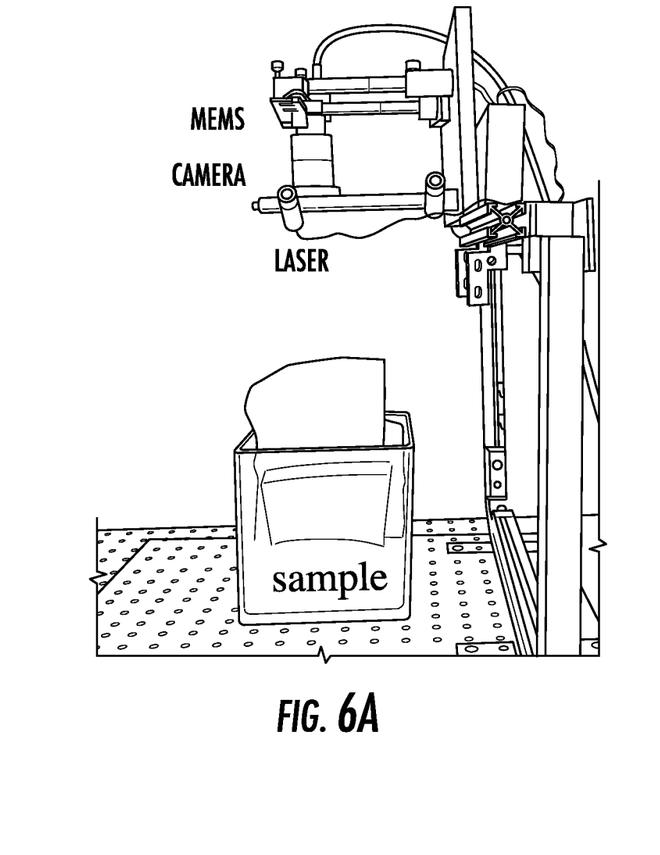
Figure 6B:
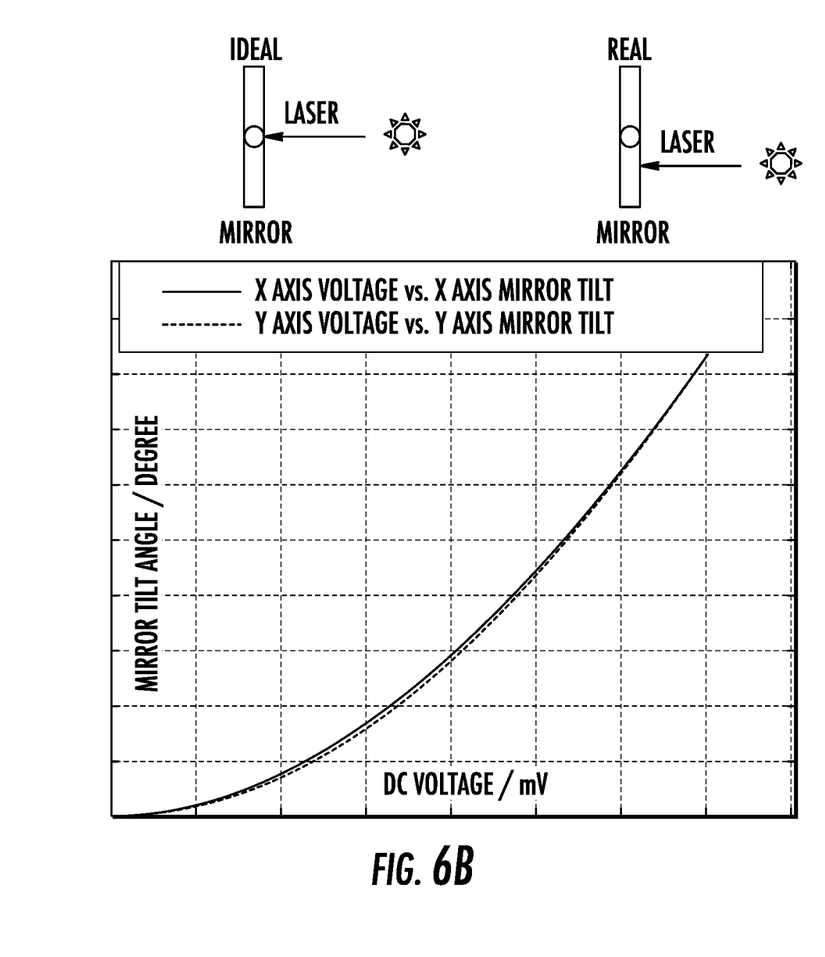

FIG. 6 shows a setup to calibrate the device to compensate for laser-mirror misalignment and the non-linearity of the MEMS mirror. Due to misalignment, the incident laser beam onto the MEMS mirror will not be perpendicular to the mirror surface and align with the MEMS rotation center. Due to non-linearity of MEMS mechanics, the input control signal and degrees of rotation are not linearly related.

The device is mounted vertically above a liquid container as shown in View (A) of FIG. 6, with no cover above the scattering medium. We model the laser-MEMS as a pinhole projector whose center of projection is the rotation center of the MEMS mirror. During the calibration process, the relative pose between the MEMS mirror and the camera is estimated. For MEMS, the non-linear mapping between the input voltage for the MEMS and the mirror tilt angle is compensated for, and the mis-alignment of the MEMS mirror and the laser is accounted for, as shown in the graph of View (B).

Figure 7A:
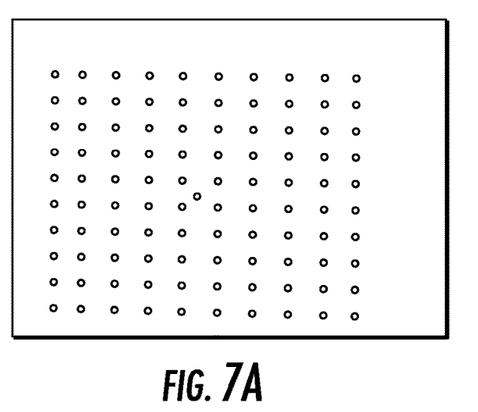
Figure 7B:
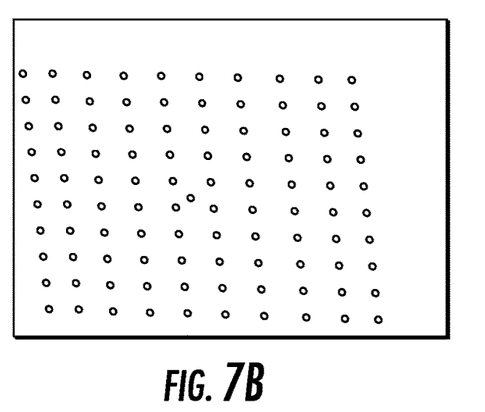
Figure 7C:
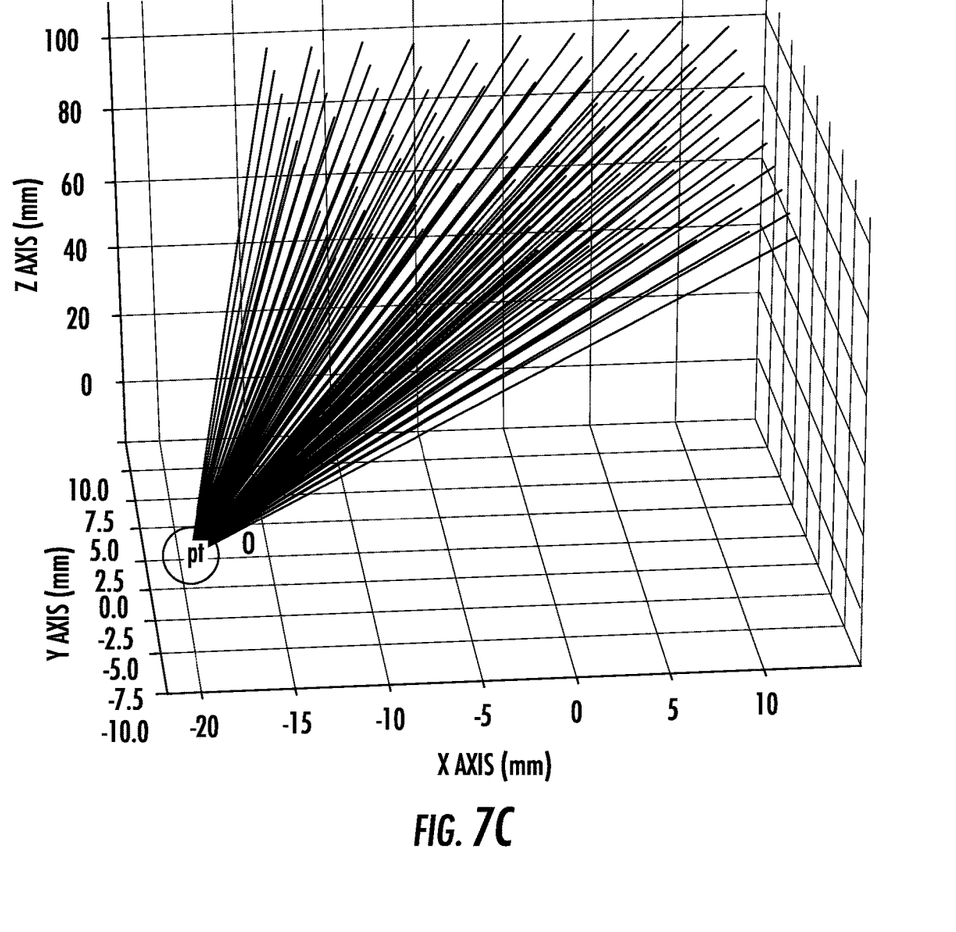

More specifically, planes are illuminated with given poses relative to the camera with a set of dot patterns. As shown in Views (A) and (B) of FIG. 7, given the laser dot images for different plane positions, the laser rays can be fitted in 3D and the rays triangulated to get the origin of the rays (i.e. the rotation center of the MEMS mirror) as shown in View (C) of FIG. 7. Due to the laser-MEMS misalignment and fitting error for the rays, the rays will not intersect at one 3D point. A least square problem is solved for the intersection point where the point to ray distances are minimized. The fitted rays are also used to account for the non-linear relation between the MEMS input voltage and the rotation angle. In calibration, a lookup table is built relating the input voltage for the MEMS and the rotation angle for the mirror to account for their non-linear relation. During imaging, given the target laser ray direction, the required input voltage can be estimated by interpolating over lookup table.

Results

The device and method of the present invention were tested using Monte Carlo rendered images. For the homogeneous medium, the scattering coefficients of human skin were used. The heterogeneous inclusions are located up to 4 mm below the surface. For the imaging setup, the width of the laser illumination line is 1 mm. The distance between the illumination line and the camera pixel ranges from 0 to 15 mm. To make the diffusion approximation valid for the algorithm, only images with the illumination-to-pixel distance $\Delta y$ larger than 2 mm were used.

Figure 8A:
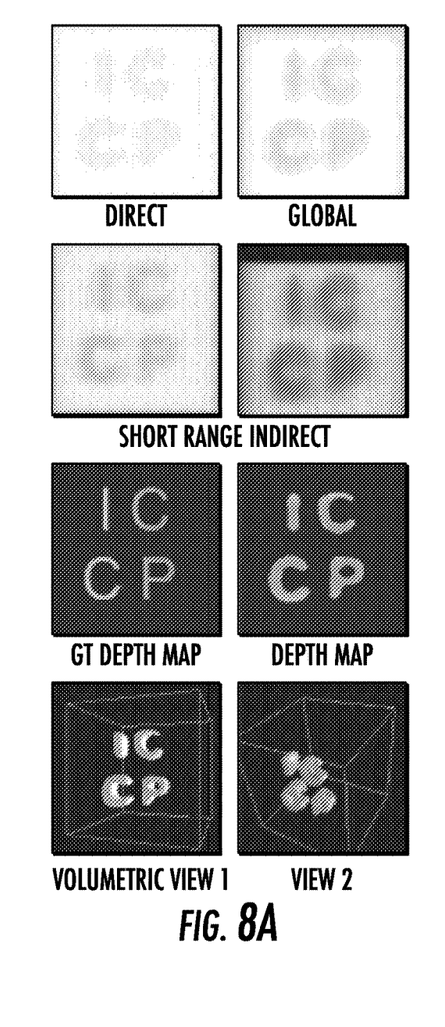
Figure 8B:
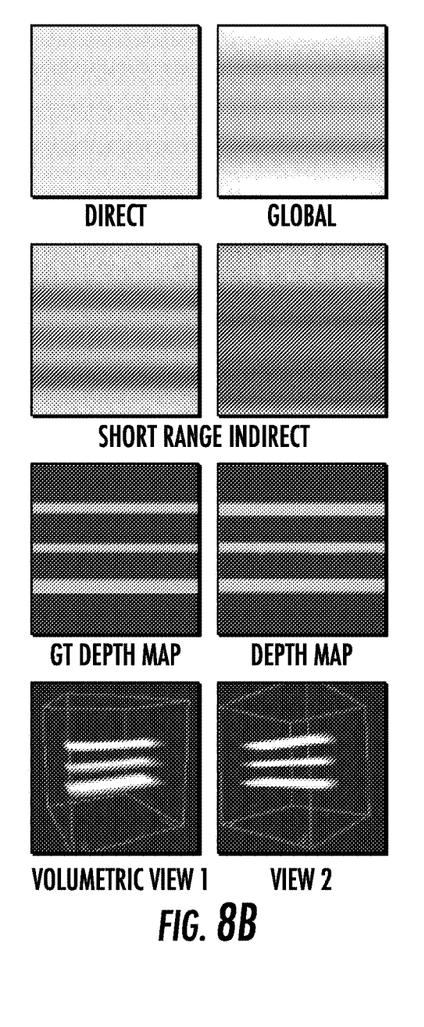
Figure 8C:
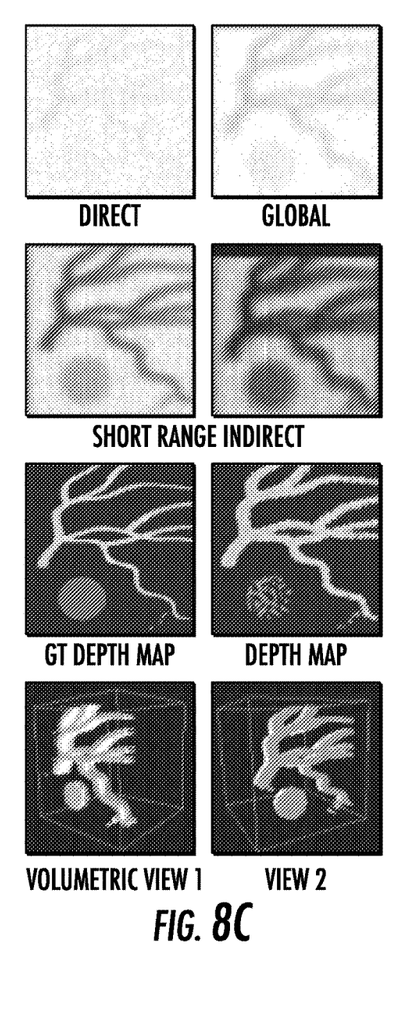

FIG. 8 shows simulated direct/global light image, the short-range images with different $\Delta y$ settings, and the DOT results. The homogeneous medium is skin in View (A) and View (C) and skim milk in View (B). Photon and read-out noise are added to the input images. The depths of inclusions in Views (A) and (B) are 4 mm and 3 mm respectively. In View (C), the depth of the vein structure is 5 mm while the solid circle is 10 mm deep. The inclusion boundaries in the global and short-range indirect images are either blurred or shifted due to light scattering. The signal-to-noise ratio decreases as the pixel-to-illumination line distance increases because less photons are received by the detectors. The method of the present invention recovered the inclusion boundaries and their relative depths despite the blurring and noise.

The simulated direct and global light images are shown in the first two rows of all views in FIG. 8. The global light image is the sum of the images captured with different $\Delta y$'s, except for $\Delta y=0$. The inclusions cannot be seen in the direct only image. For the global light image, because of the highly scattering property of skin, the contrast is low for some of the deeper inclusions, such as the solid circle in the View (C). This makes the detection and localization for such objects (e.g. tumor beneath the skin surface) difficult. For each short-range indirect image, the image intensity is contributed in part by the indirect light that travels from the illumination line with a preset distance to the imaged scene point. As a result, compared with the global light image, the contrast of the inclusions are much higher for the short-range indirect images shown in the third and fourth rows of all views in FIG. 8. For larger pixel to illumination line distance, the signal-to-noise ratio is low because there are less photons reaching the imaged scene point due to multiple scattering of light. In addition, because the non-zero support of the diffuse scattering kernel increases with the pixel-to-illumination line distance, the boundaries of the inclusions in the image become blurrier for larger distance. Despite low signal-to-noise ratio and blurring in the short-range indirect images, the 2D boundaries were able to be localized and the relative depth were estimated for the inclusions using the novel method of the present invention.

For the input short range indirect images, the contrast of the image decreases with the inclusion depth. This is because as the inclusions become deeper, most light reaching each pixel is contributed by the scattered light from the homogeneous medium without traveling through the inclusions. Another intuition is that the diffuse scattering phase function diminishes with the depth increase, as shown in FIG. 4. One key factor for the proposed method is the size of the diffuse scattering kernel. A smaller kernel enables a faster optimization process but will lead to more errors in the convolutional approximation and therefore less accurate results. A larger kernel leads to better performance but requires more processing time. The choice for the size of diffuse scattering kernel is also related to the pixel to illumination line distance. In addition, as shown in FIG. 4, the non-zero support region for the kernel varies with the pixel to illumination line distance. For large pixel to illumination line distance, the magnitude of the kernel would be small due to multiple scatterings, so the performance will saturate at certain distance.

The performance of the apparatus and method of the present invention may be evaluated using the IoU score of segmentation results for the inclusions. For highly scattering medium, like human skin, the performance saturates when the kernel size approaches 20 mm in diameter.

The present invention addresses two fundamental limitations of existing diffuse optical tomography methods: low resolution reconstruction and high computational complexity. These limitations are overcome by (1) extending the design for short-range indirect subsurface imaging to a verged scanning projector and camera configuration; and (2) a novel convolution based model and efficient computational algorithm for estimating the subsurface medium with absorption variation. This allowed the recovery of detailed absorption variations immersed up to 8 mm deep in a highly scattering medium, such as milk.

The invention has been described herein using specific apparatuses, methods and parameters. The scope of the invention is not meant to be limited thereby. Other embodiments are contemplated to be within the scope of the invention. For example, other source spectra (e.g., near-infra red) may be used to recover structures deeper within tissue.

Additionally, the invention may be extended to use resonant MEMS scanning for capturing subsurface videos of dynamic structures, such as blood flow in microscopic capillary veins. The scope of the invention is captured in the claims that follow.

The invention claimed is:

1. An apparatus comprising:
a laser projector; and
a camera, the laser projector and camera being in a verged epipolar configuration forming a camera-projector pair;
wherein the laser projector is scanned through a series of discrete epipolar planes of the camera-projector pair, each epipolar plane illuminating a line on a surface of a medium, each epipolar plane having a different slope with respect to the surface of the medium;
wherein the camera is synchronized with the laser projector such that a line of pixels on a camera image plane are exposed, the exposed line of pixels imaging a line on the surface of the medium at a fixed offset from the currently-illuminated line on the surface of the medium; and
wherein an interpolation is performed over the series of discrete epipolar planes to form a short-range indirect image.

2. The apparatus of claim 1, the laser projector comprising:
a laser source; and
a steerable mirror for directing a line of light along the surface of the medium.

3. The apparatus of claim 1 wherein the short-range indirect image comprises an image of structures under the surface of the medium and is obtained by evaluating a phase function for each of a plurality of voxels in a volume of voxels located under the surface of the medium, the phase function being evaluated based on a quantity of light traversing each voxel and reaching a corresponding pixel in the currently exposed line of pixels.

4. The apparatus of claim 1 wherein a plurality of short-range indirect images are captured at different fixed offsets between the illuminated line and the imaged line on the surface of the medium.

5. The apparatus of claim 4 wherein optical parameters of each voxel in a volume of voxels located under the surface of the medium are determined by an optimization procedure performed over the plurality of short-range indirect images.

6. The apparatus of claim 5 wherein differences in intensity of corresponding pixels in each short-range indirect image in the plurality of short-range indirect images is used to estimate an absorption coefficient for each voxel in the volume of voxels.

7. The apparatus of claim 6 wherein the estimated absorption coefficients for each voxel are used to visualize a three-dimensional representation of a sub-surface absorption variation in the medium causing variations in the determined absorption coefficient from an absorption coefficient of a homogenous portion of the medium.

* * * * *